United States Patent Office 3,002,938
Patented Oct. 3, 1961

3,002,938
METHOD OF MAKING NATURAL RUBBER RESISTANT TO OZONE BY THE ADDITION OF POLYTETRAFLUORETHYLENE AND PRODUCT THEREOF
Joseph L. Gagne, Somerset, Mass., assignor to Davol Rubber Company, Providence, R.I., a corporation of Rhode Island
No Drawing. Filed Aug. 25, 1958, Ser. No. 757,119
4 Claims. (Cl. 260—4)

This invention relates to the manufacture of rubber and more particularly to the manufacture of a rubber compound which will be resistant to the damaging effects of ozone.

This application is a continuation-in-part of co-pending application, Serial No. 563,856, filed February 7, 1956, now abandoned.

It is well known that rubber compounds, particularly when stressed, are susceptible to ozone attack. Ozone attack is a common phenomenon since most rubber items are under stress during use and ozone is universally present in the atmosphere. Ozone is generated from oxygen in the air by ultraviolet light, from sunlight, or by high voltage discharge. Concentrations in rural areas vary from 1 to 5 parts per hundred million, and in larger cities, concentrations as high or higher than 50 p.p. hm. have been measured.

A primary object of the instant invention is the provision of a new rubber compound which will resist ozone cracking and the methol of manufacturing same.

Another object of the instant invention is the provision of an additive for rubber compounds which will render the compounds resistant against ozone cracking, but which, at the same time, will have virtually no other appreciable effect on the properties of the compounds.

Another object of the invention is the provision of a novel process for treating rubber compounds of the type particularly susceptible to ozone cracking, namely, organic rubbers or rubber-like material of a hydrocarbon nature having carbon to carbon unsaturation in the molecule, whereby the rubber compounds will not be affected by ozone.

A further object of the invention is the provision of a novel process for making rubber compounds insensitive to ozone cracking, which process comprises the addition of an inhibitor agent during the mixing of the rubber batch.

Still another object is the provision of a method for making rubber compounds insensitive to ozone cracking, which method is particularly effective where the rubber compound is molded to arrive at the desired end product.

A further object of the instant invention is the provision of means for rendering rubber compounds non-susceptible to the damaging effects of ozone cracking, which means are effective in use, but nevertheless simple and economically feasible to put into practice.

Other objects, features and advantages of the invention will become apparent as the description thereof proceeds.

It is well-recognized and established fact that the cracking of stressed rubber compounds is accelerated by the presence of ozone in the air with which the rubber compounds are in contact. Of course, other atmospheric factors, such as sun and humidity, also contribute to the deterioration of stressed rubber, but it has been found that the useful life of rubber and rubber-like articles can be greatly prolonged where the effects of ozone can be counteracted.

Many prior art attempts have been made to combat ozone cracking in rubber compounds, but none have solved the problem in a satisfactory fashion. For example, the formation of a protective surface film is one art method of combating the injurious effects of ozone. More specifically, an ozone-resistant coating may be applied, but this has been found disadvantageous because of the relatively high expense involved, as well as only moderately successful in operation, due to such disadvantages as increased water absorption characteristics and the like.

Also, a protective surface has been heretofore formed by introducing substances into the rubber which migrate to the surface thereof to form a film thereon. Waxy substances such as hydrocarbon waxes, when added to the rubber in excess of their solubility, have been thusly used but have proven to be of little value during dynamic deformation of the rubber. Furthermore, such waxy substances have proven quite unsatisfactory for commercial articles becasue they tend to discolor and become unsightly, and also because the waxy texture that results is frequently undesirable.

Accordingly, there is provided in accordance with the instant invention a rubber compound, and method of manufacturing the same, which is insensitive to ozone cracking. More specifically, the invention is directed to those rubber compounds which normally are susceptible to ozone cracking, namely, natural rubber and organic rubbers or rubberlike materials which are of a hydrocarbon nature, having carbon to carbon bonds, a degree of carbon to carbon unsaturation, and capable of vulcanization. The term "rubber compounds susceptible to ozone attack," as used herein is meant to include this type of material. The rubber compounds may be natural rubber or homopolymers, copolymers or terpolymers and the like of butadiene, isoprene, dimethyl butadiene, chloroprene, cyanobutadiene, and the like, and copolymers of these materials with such mono-olefins as vinyl chloride, acrylic acid, acrylates, methacrylic acid, methacrylates, acrylonitrile, and styrene.

It should be understood that polymeric materials of a rubber-like nature having no carbon to carbon unsaturation are not contemplated in this invention, since such materials are inately resistant to the effects of ozone. This includes the polymers of such mono-olefins as are listed above and such materials as chlorosulfonated polyethylene, polysulfide rubbers, polyalkyl-silicone rubbers and the like.

This invention has been found to work extremely well with such rubber compounds as natural rubber, polyisoprene, copolymer of styrene and butadiene, polychloroprene, copolymer of isoprene and polyisobutylene, and the copolymer of polybutadiene and acrylonitrile.

It has been found that by introducing a quantity of a chemical of the fluoroethylene class to the rubber compound during the mixing thereof, the finished compound will possess extraordinary resistance against ozone cracking. Furthermore, use of this particular inhibitor agent in the manner hereinafter described has no effect on the other properties of the rubber compound other than to result in a slight stiffening of the same, amounting to approximately a difference of five calibrations on the Shore-A Durometer. Also, the uncured rubber stock having this additive therein is characterized by a slightly roughened appearance.

This invention is particularly effective in connection with dry rubber compounds such as pale crepe or smoke sheet. The rubber, whether it be natural or synthesized, is broken down on a mill in a well-known manner and other fillers and softeners are slowly added. When these are blended in, zinc oxide and accelerators, in that order, are introduced into the mixture, all in a manner heretofore well known in the mixing of rubber batches.

At this point, when all of the ingredients, with the exception of sulfur, have been blended into the rubber, the inhibitor is slowly and evenly dispersed into the batch. As hereinbefore stated, the inhibitor is a chemical of the fluoroethylene class, and polytetrafluoroethylene has proven to be particularly effective. The quantity of polytetrafluoroethylene introduced should be in an amount comprising ¾ to 2½ percent by weight of the entire mixture for best results. When less than ¾ percent by weight of additive is used, the polytetrafluoroethylene has virtually no appreciable effect. Likewise, if more than 2½ percent by weight of the additive is used, then extreme difficulty is experienced in processing the rubber compound. Care should be taken to insure that the inhibitor is well dispersed before adding sulfur to the mixture, and in this respect, it has been found that better dispersion is obtained at slightly higher than normal temperatures. Sulfur is then added to the mixture in accordance with established practice, and the stock is then ready for ultimate processing and curing.

While the best results are obtained by introducing my inhibitor agent at a late stage during the mixing of the rubber batch, as above described, it will be understood that this is not a limiting feature of my invention. On the contrary, the inhibitor could be added to the mixture at an earlier point, but with lesser results.

It has been found that the polytetrafluoroethylene, after thorough dispersion into the mixture, forms a homogeneous mass therewith. In this respect, considerably better results are obtained than is the case, for example, with the hydrocarbon waxes afore discussed wherein a protective surface film is formed, which film may be quite easily rubbed or scraped off to once again expose the rubber to the damaging effects of ozone. In practice, it has been observed that when a rubber compound with my inhibitor therein is put under compression, such as during a molding operation, a more thorough dispersion of the inhibitor is achieved. Hence, my invention is of particular value in connection with molded rubber and rubber-like articles.

A specific formulation which has proven effective is as follows:

| | |
|---|---|
| Pale crepe | 32 lbs. 8 ozs. |
| Buna (synthetic rubber) | 8 lbs. |
| Orange master No. 1843 (organic coloring) | 7 lbs. |
| No. 352 master (coloring agent) | 2 lbs. 8 ozs. |
| No. 2246 antioxidant | 6 ozs. |
| Protox (zinc oxide) | 2 lbs. |
| Altax master (benzothiazyl di-sulfide, accelerator) | 2 lbs. 8 ozs. |
| DPG master (diphenylguanidine, accelerator) | 11 ozs. |
| Migralube (zinc stearate, activator) | 3 ozs. |
| Tetra ethylamine (activator) | 45 cc. |
| Perfume (reodorizer) | 4 cc. |
| Picco resin (processing agent) | 1 lb. 8 ozs. |
| Calcium carbonate (filler) | 30 lbs. |
| Calcene (filler) | 8 lbs. |
| Blanc fixe (barium sulfate, filler) | 20 lbs. |
| Amberex (vulcanized vegetable oil) | 4 lbs. |
| Polytetrafluoroethylene (inhibitor) | 1 lb. 13 ozs. |

The above formulation was tested without the additive, and with varying amounts of the additive, under the extreme conditions of 75 parts per hundred million of ozone at 100° F. with the following results:

| | |
|---|---|
| Formulation without additive | Cracks appear in ten minutes. |
| Formulation + ¾% additive | Cracks appear in 45 minutes. |
| Formulation + 2½% additive | Cracking appears in 3 hours. |

Although the results show the improvement obtained with the use of the additive, it should be noted that the 75 parts per hundred million of ozone is a much higher concentration of ozone than would be expected to be encountered in actual usage. This increase in the ozone content of the air utilized in the test, results in a more accelerated cracking than would be encountered under normal usage conditions.

It will be obvious to those skilled in the art that various changes may be made without departing from the spirit of the invention and therefore the invention is not limited to what is described in the specification, but only as indicated in the appended claims.

What is claimed is:
1. The method of making a natural rubber compound which will be resistant to ozone cracking, comprising the steps of milling the raw natural rubber, slowly adding and blending therewith fillers and softeners, adding zinc oxide and then accelerators, slowly and evenly dispersing into the blend ¾ to 2½ percent by weight of the formulation of polytetrafluoroethylene, when the polytetrafluoroethylene has been well dispersed adding sulfur, and then processing and curing.

2. The process of preventing the deterioration of a molded natural rubber compound upon exposure to ozone, comprising the step of adding ¾ to 2½ percent weight of the formulation of polytetrafluoroethylene during the mixing of the natural rubber compound formulation.

3. The process of preventing the deterioration of a molded natural rubber compound upon exposure to ozone, comprising the step of adding ¾ to 2½ percent by weight of the formulation of polytetrafluoroethylene immediately prior to the addition of sulfur during the mixing of the natural rubber compound formulation.

4. An ozone resistant material consisting of natural rubber having ¾ to 2½ percent by weight of the material of polytetrafluoroethylene evenly dispersed therein.

References Cited in the file of this patent

UNITED STATES PATENTS

| | | |
|---|---|---|
| 2,557,928 | Atkinson | June 26, 1951 |
| 2,710,290 | Safford et al. | June 7, 1955 |
| 2,718,452 | Lontz | Sept. 20, 1955 |
| 2,867,599 | Hurd et al. | Jan. 6, 1959 |

FOREIGN PATENTS

| | | |
|---|---|---|
| 673,962 | Great Britain | June 18, 1952 |
| 1,075,088 | France | Apr. 7, 1954 |